2 Sheets—Sheet 1.
B. MERTZ.
MOWING MACHINE.
No. 29,985. Patented Sept. 11, 1860.
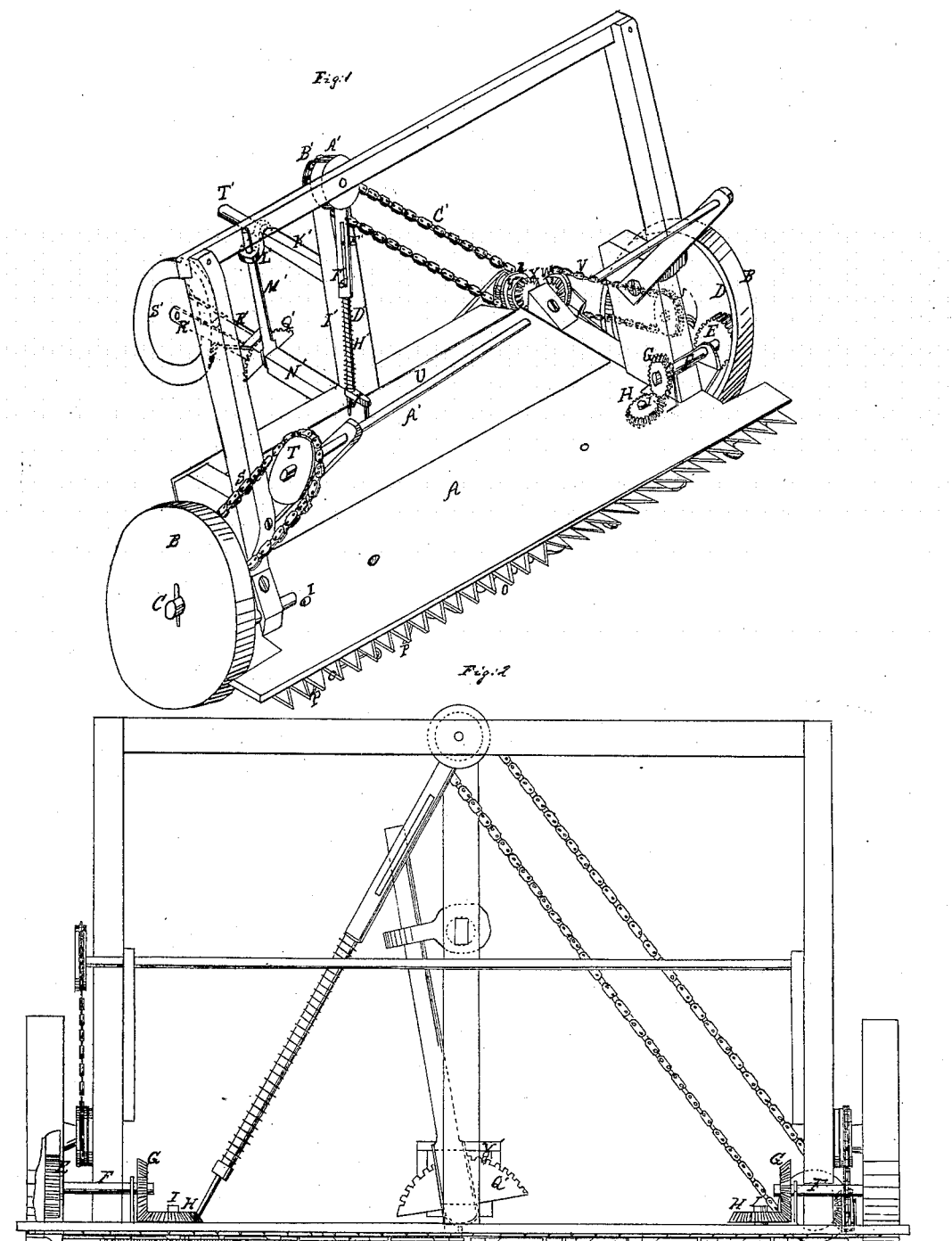

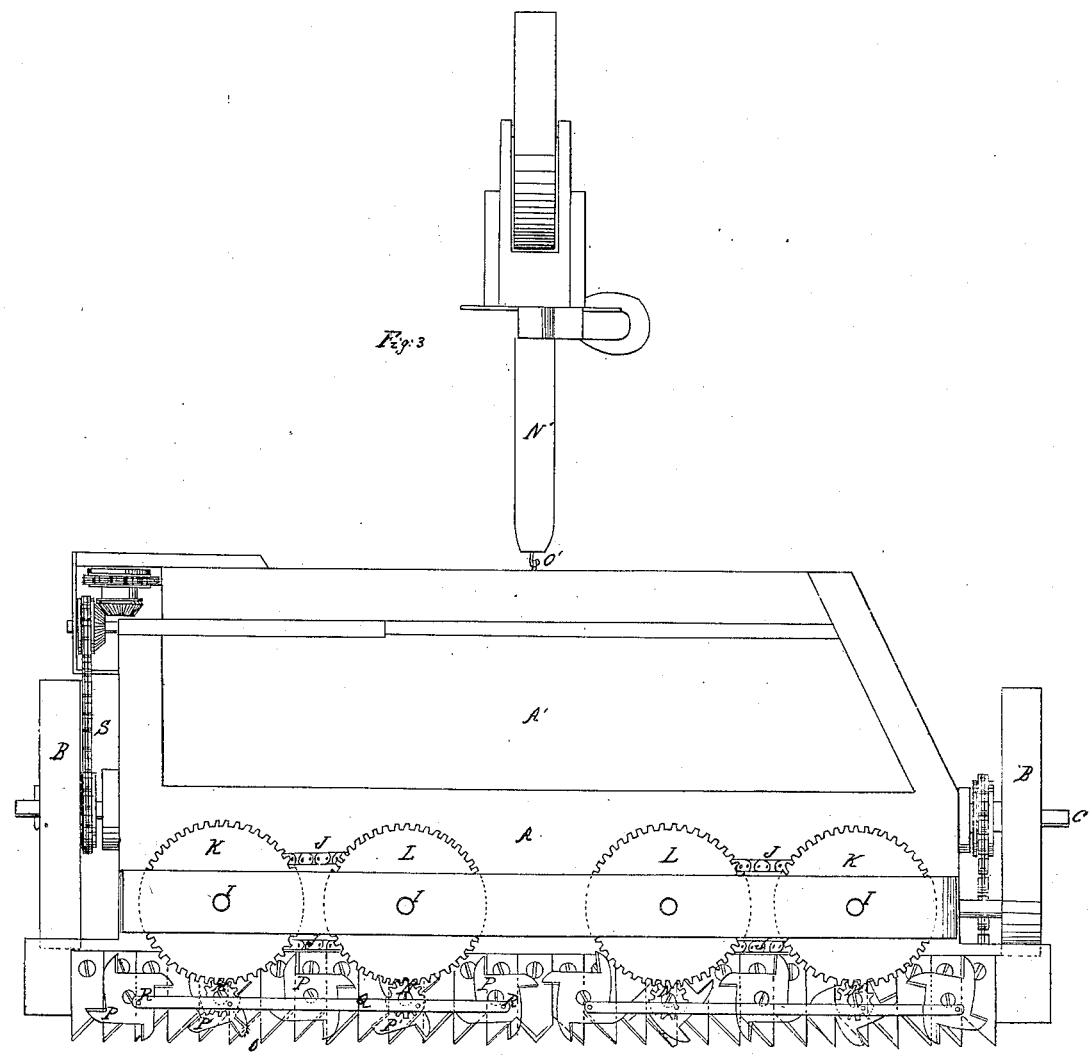

UNITED STATES PATENT OFFICE.

BERNHARD MERTZ, OF BURLINGTON, IOWA.

IMPROVEMENT IN HARVESTING-MACHINES.

Specification forming part of Letters Patent No. 29,985, dated September 11, 1860.

*To all whom it may concern:*

Be it known that I, BERNHARD MERTZ, of Burlington, in the county of Des Moines and State of Iowa, have invented a new and useful Improvement in Reaping-Machines; and I do hereby declare that the following is a full, clear, and exact description of the same, reference being had to the accompanying drawings, forming a part of this specification, in which—

Figure 1 represents a perspective view, Fig. 2 a front elevation, and Fig. 3 a bottom view of my machine.

Similar letters of reference in each of the several figures indicate corresponding parts.

The nature of my invention consists in hinging the front end of the tongue to the back of the machine by means of a joint, in combination with a universal joint, toothed arc, and pawl, for the purpose of throwing the machine into an oblique position in relation to the guide-wheel whenever the operator desires to turn the machine.

To enable others skilled in the art to make and use my invention, I will proceed to describe its construction and operation.

The machine is supported upon two large driving-wheels, B B, one at each side of the machine. These wheels run on short shafts or pivots C C, extending from the main frame of the machine independent of each other. The machine being supported upon two driving-wheels—one at each end of the machine—all side draft is effectually obviated.

The disadvantage of having two driving-wheels upon one shaft is that this shaft is in the way of the reel as well as of the cut grain, and that for this reason the cutting apparatus and reel have to be moved out a considerable distance from said shaft, whereby the size of the platform, and consequently the weight of the machine, is very considerably increased.

Each of the wheels B is provided with cogs D inside of its rim, taking into a pinion, E, the shaft F of which transfers motion to bevel-gearing G H, shaft I, and horizontal cog-wheel K underneath the platform A, the wheel K being keyed to shaft I.

An endless band, J, passes from a pulley on shaft I around another pulley on the shaft of a second cog-wheel, L, so that both cog-wheels may revolve in the same direction. These cog-wheels K L take into pinions M N, respectively, upon the short shafts of revolving sickle-cutters P' P'. Other sickle-cutters, P, are hung to the sickle-cutters P' P' by means of a connecting-rod, Q, secured to eccentric-pins projecting from the sickle-cutters. By this means, it will be seen, all the cutters will be made simultaneously to revolve, and the cutters of one half of the machine to work independently of the cutters of the other half, so as not to interfere with the turning of the machine.

The advantage of having the cutters underneath the fingers or stationary cutters O is that the stalks or blades shall be cut between the roots and the point where they are held between the fingers. By this means the cutting of the grain or grass is much easier than if it were to be cut above the fingers or stationary cutters, on the same principle that in using a hand-sickle the grass is cut below and not above the hand which grasps the blades. It will also be seen that the sickle-blades are set oblique in the opposite directions to the line of draft, and that the cutters have their edges radial to the axis on which they revolve. By this construction the grain, in being cut, is not gathered toward the root of the sickle-blades and cutters, but is forced on toward the points of the sickles. This operation insures a perfect cut and avoids clogging or choking of the machine.

A pulley upon the shaft or pivot of one of the driving-wheels and an endless band, S, serve to transmit rotary motion to the pulley T and reel-shaft U. A pulley upon the shaft of the other driving-wheel and endless band V transmit motion to bevel-gearing W X and drums Z Y upon the shaft of bevel-wheel X. An endless band or chain, C', transmits motion from drum Z Y to drum A B upon a horizontal or nearly-horizontal shaft in the center of the upper part of the machine.

The drums may be made in a number of sections of different diameters. The drawings represent each drum as made in two sections, Z Y and A' B', and the belt C' passing from the larger section Z of drum Y Z onto the smaller section B' of drum A' B'. On removing the belt from these sections and passing it around the sections Y and A' the drum A' B' and the rake attached to it will be made to revolve with a smaller velocity. By this means the velocity of the rake can be so regulated that it will make sheaves of the same size, no matter how thick or thin the grain stands.

The rake consists of a socket, F', radially projecting from the front part of drum A' B'. A rod, D', with the rake J' at its lower end, has a cross-pin, E', near its upper end, sliding in slots G' of the socket. Thus the rod can play up and down in the socket and the rake travel in a horizontal line across the platform while the socket swings around in a circle. A spiral spring, H', keeps the rake down against the platform while moving across it.

The horses are hitched to the tongue N' behind the machine. The front end of the tongue is connected to this machine by means of a universal joint, O', and the tongue terminates at the rear into a fork, R' R', which forms the bearings of the shaft of a guide-wheel, S'. A lever, M', is hung at its lower end to the tongue N', so as to be free to turn around it. The upper part of said lever plays in a link, L', which is also hung to an arm, K, extending from the standard I' of the main frame. In this manner it will be seen, the parts K' L' M' form a kind of a universal joint. A pawl, V', pivoted to the foot-board fastened to the tongue, takes into a toothed arc, Q', fastened to the lower part of lever M'. This pawl serves to keep the guide-wheel and machine in a straight line. When the driver, who has his seat above the guide-wheel and takes hold of the handle T' of arm K', wishes to turn the machine he releases the pawl from the toothed arc and bears sidewise against the handle T', which will at once bring the machine in an oblique position in relation to the guide-wheel, or vice versa, and thus cause the machine to turn. If the operator desires to depress or raise the cutting apparatus, he can do so by raising or depressing the handle T'. The link L', sliding up or down upon lever M', does not interfere with this adjustment of the cutting apparatus. The tongue N', being hung to the rear of the machine at O', accommodates itself freely to the rise or fall of the latter, and the universal joint O', being at the center of the length of the machine, allows of the machine being turned in a shorter space than if the tongue were made stiff and furnished with a steering-wheel at its extreme rear end, as commonly.

What I claim as my invention, and desire to secure by Letters Patent, is—

Hinging the front end of the tongue N' to the back of the machine by means of a joint, O', in combination with the universal joint K' L' M', toothed arc Q', and pawl V', substantially as and for the purposes set forth.

The above specification of my improved harvester signed by me this 23d day of July, 1860.

BERNHARD MERTZ.

Witnesses:
GOODWIN Y. ATLEE
R. W. FENWICK.